US012275255B2

(12) United States Patent
Murayama et al.

(10) Patent No.: US 12,275,255 B2
(45) Date of Patent: Apr. 15, 2025

(54) PRINTING CASSETTE AND PRINTER

(71) Applicant: BROTHER KOGYO KABUSHIKI KAISHA, Nagoya (JP)

(72) Inventors: Kentaro Murayama, Kasugai (JP); Shota Iijima, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 147 days.

(21) Appl. No.: 17/700,347

(22) Filed: Mar. 21, 2022

(65) Prior Publication Data

US 2022/0274422 A1 Sep. 1, 2022

Related U.S. Application Data

(63) Continuation of application No. PCT/JP2020/034863, filed on Sep. 15, 2020.

(30) Foreign Application Priority Data

Sep. 30, 2019 (JP) ................................ 2019-178162

(51) Int. Cl.
*B41J 2/325* (2006.01)

(52) U.S. Cl.
CPC .................................... *B41J 2/325* (2013.01)

(58) Field of Classification Search
CPC ................................ B41J 2/325; B41J 15/044
See application file for complete search history.

(56) References Cited

U.S. PATENT DOCUMENTS

| | | | |
|---|---|---|---|
| 3,672,603 | A | 6/1972 | Swain |
| 3,804,227 | A | 4/1974 | Cappotto et al. |
| 3,823,808 | A | 7/1974 | Murata et al. |
| 3,948,382 | A | 4/1976 | Nesbitt et al. |
| 4,034,935 | A | 7/1977 | Plaza et al. |
| 4,252,450 | A | 2/1981 | Goodman et al. |

(Continued)

FOREIGN PATENT DOCUMENTS

| | | |
|---|---|---|
| CN | 101856919 A | 10/2010 |
| CN | 102092201 A | 6/2011 |

(Continued)

OTHER PUBLICATIONS

Iwane, Machine TranslationofJP-H08183232-A, 1996 (Year: 1996).*

(Continued)

*Primary Examiner* — Scott A Richmond
(74) *Attorney, Agent, or Firm* — KENEALY VAIDYA LLP

(57) ABSTRACT

A printing cassette that is attached to a printer main body, the printer main body including a print head, a platen roller facing the print head, and a drive source configured to cause the platen roller to rotate, the printing cassette comprising: a first tape on which printing is performed by the print head; an input unit that is rotatable around a rotation axis thereof and is transmitted a driving force from the drive source; and an output unit that is rotatable around a rotation axis thereof and is configured to transmit to the platen roller the driving force that is transmitted to the input unit, wherein the first tape is conveyed by the platen roller in a state where the printing cassette is attached to the printer main body.

12 Claims, 14 Drawing Sheets

(56) References Cited

U.S. PATENT DOCUMENTS

| | | | |
|---|---|---|---|
| 4,351,619 A | 9/1982 | Duke et al. | |
| 4,397,574 A | 8/1983 | Wojdyla | |
| 4,402,619 A | 9/1983 | Paque et al. | |
| 4,490,059 A | 12/1984 | Daughters | |
| 4,499,513 A | 2/1985 | Umeda | |
| 4,538,931 A | 9/1985 | Nagashima | |
| 4,565,128 A | 1/1986 | Moriyama et al. | |
| 4,598,780 A | 7/1986 | Iwasaki et al. | |
| 4,668,961 A | 5/1987 | Hiramatsu | |
| 4,832,514 A | 5/1989 | Basile | |
| 4,856,921 A | 8/1989 | Hatakeyama | |
| 5,099,378 A | 3/1992 | Turgeon | |
| 5,145,268 A | 9/1992 | Cavallini | |
| 5,325,114 A | 6/1994 | Fogle et al. | |
| 5,402,954 A | 4/1995 | Skavnak et al. | |
| 5,435,657 A | 7/1995 | Pearce et al. | |
| 5,472,286 A | 12/1995 | Uemura et al. | |
| 5,536,092 A | 7/1996 | Yamaguchi | |
| 5,619,244 A | 4/1997 | Manna | |
| 5,636,926 A | 6/1997 | Yamaguchi | |
| 5,645,360 A | 7/1997 | Iwane et al. | |
| 5,917,532 A | 6/1999 | Cornell et al. | |
| 5,959,652 A | 9/1999 | Privin | |
| 6,511,238 B1 | 1/2003 | Glize | |
| 2007/0172286 A1 | 7/2007 | Pomfret | |
| 2008/0084494 A1 | 4/2008 | Pomfret | |
| 2010/0166475 A1 | 7/2010 | Yamaguchi et al. | |
| 2010/0166477 A1 | 7/2010 | Yamaguchi et al. | |
| 2010/0166478 A1 | 7/2010 | Yamaguchi et al. | |
| 2010/0166479 A1 | 7/2010 | Yamaguchi et al. | |
| 2010/0166480 A1 | 7/2010 | Yamaguchi et al. | |
| 2010/0247205 A1 | 9/2010 | Yamaguchi et al. | |
| 2010/0247206 A1 | 9/2010 | Yamaguchi et al. | |
| 2010/0247208 A1 | 9/2010 | Yamaguchi et al. | |
| 2010/0247212 A1 | 9/2010 | Yamaguchi et al. | |
| 2010/0254742 A1 | 10/2010 | Yamaguchi et al. | |
| 2010/0260528 A1* | 10/2010 | Takahashi | B41J 3/4075 400/586 |
| 2012/0080550 A1 | 4/2012 | Yamaguchi et al. | |
| 2013/0195535 A1 | 8/2013 | Kosuge et al. | |
| 2016/0368294 A1 | 12/2016 | Sakano et al. | |
| 2017/0190195 A1 | 7/2017 | Kosuge et al. | |
| 2018/0022110 A1 | 1/2018 | Sasaki | |
| 2018/0264844 A1 | 9/2018 | Sasaki | |
| 2020/0406655 A1* | 12/2020 | Iijima | B41J 32/00 |

FOREIGN PATENT DOCUMENTS

| | | | | |
|---|---|---|---|---|
| CN | 103241015 A | | 8/2013 | |
| CN | 103273748 A | | 9/2013 | |
| CN | 107073982 A | | 8/2017 | |
| CN | 109941005 A | | 6/2019 | |
| EP | 0414544 A2 | | 2/1991 | |
| GB | 2016411 A | | 9/1979 | |
| JP | S50-36734 B1 | | 11/1975 | |
| JP | S54-111914 A | | 9/1979 | |
| JP | S58-141479 A | | 8/1983 | |
| JP | S59-6460 A | | 1/1984 | |
| JP | S59-95180 A | | 6/1984 | |
| JP | S60-8072 U | | 1/1985 | |
| JP | S60-9657 U | | 1/1985 | |
| JP | 60021289 A | * | 2/1985 | |
| JP | 600221289 A | * | 2/1985 | |
| JP | S60-21289 A | | 2/1985 | |
| JP | S60-36255 U | | 3/1985 | |
| JP | S60-46254 U | | 4/1985 | |
| JP | S60-48456 U | | 4/1985 | |
| JP | S60-146749 U | | 9/1985 | |
| JP | S60-188821 A | | 9/1985 | |
| JP | S60-224571 A | | 11/1985 | |
| JP | S61-154877 A | | 7/1986 | |
| JP | S62-103179 U | | 5/1987 | |
| JP | S63-156762 U | | 10/1988 | |
| JP | H02-6173 A | | 1/1990 | |
| JP | H02-9562 U | | 1/1990 | |
| JP | H02-11379 A | | 1/1990 | |
| JP | H02-11380 A | | 1/1990 | |
| JP | H02-37568 Y2 | | 10/1990 | |
| JP | H03-97181 A | | 4/1991 | |
| JP | H03-284973 A | | 12/1991 | |
| JP | H04-152176 A | | 5/1992 | |
| JP | H05-41834 U | | 6/1993 | |
| JP | H05-53956 A | | 7/1993 | |
| JP | H07-9745 A | | 1/1995 | |
| JP | H07-32710 A | | 2/1995 | |
| JP | H07-68814 A | | 3/1995 | |
| JP | H07-276755 A | | 10/1995 | |
| JP | H07-276757 A | | 10/1995 | |
| JP | H08-183204 A | | 7/1996 | |
| JP | H08183232 A | * | 7/1996 | |
| JP | H10-193705 A | | 7/1998 | |
| JP | 2000-6504 A | | 1/2000 | |
| JP | 2000-103149 A | | 4/2000 | |
| JP | 2001-47713 A | | 2/2001 | |
| JP | 2002-211092 A | | 7/2002 | |
| JP | 2007-502221 A | | 2/2007 | |
| JP | 2008-261968 A | | 10/2008 | |
| JP | 2009-196804 A | | 9/2009 | |
| JP | 2010-234772 A | | 10/2010 | |
| JP | 2011-46142 A | | 3/2011 | |
| JP | 2011101950 A | * | 5/2011 | B41J 15/044 |
| JP | 2011-148167 A | | 8/2011 | |
| JP | 2011-150007 A | | 8/2011 | |
| JP | 2012-158175 A | | 8/2012 | |
| JP | 2012-236307 A | | 12/2012 | |
| JP | 2014-170142 A | | 9/2014 | |
| JP | 2015-182318 A | | 10/2015 | |
| WO | 2005/018944 A1 | | 3/2005 | |

OTHER PUBLICATIONS

Ikeda, MachineTranslationofJP-600221289-A, 1985 (Year: 1985).*
Yamaguchi, MachineTranslationofJP-2011101950-A, 2011 (Year: 2011).*
Ikeda, Machine TranslationofJP-60021289-A, 1985 (Year: 1985).*
International Search Report for PCT/JP2020/034863 dated Nov. 17, 2020.
Chinese Office Action for the related Chinese Patent Application No. 202080066717.X dated Feb. 9, 2024.
Chinese Office Action for the corresponding Chinese patent application No. 202080066717.X dated Jul. 18, 2024.
International Preliminary Report on Patentability dated Apr. 5, 2022 and Written Opinion of the International Search Report for PCT/JP2020/034863 dated Nov. 17, 2020.

* cited by examiner

PRINTING CASSETTE AND PRINTER

CROSS-REFERENCE TO RELATED APPLICATION

This is a continuation application of International Application No. PCT/JP2020/034863 filed on Sep. 15, 2020 which claims priority from Japanese Patent Application No. 2019-178162 filed on Sep. 30, 2019. The entire contents of the earlier applications are incorporated herein by reference.

TECHNICAL FIELD

The disclosure relates to a printing cassette and a printer.

BACKGROUND

In a known printer that performs printing on a printing tape, the printing tape is replaced and supplied by being attached and detached a cassette storing the printing tape to and from a main body.

SUMMARY

In the known printer, the printing tape in the cassette is conveyed toward the outside of the cassette by the platen roller in the main body. The platen roller is rotationally driven by a drive source such as a motor.

However, if the platen roller rotates when the cassette is not attached to the main body, an unexpected problem may occur. For example, when the platen roller rotates during mounting of the cassette, a jam of the printing tape may occur.

Aspects of the disclosure provides a printing cassette and a printer that may suppress unexpected rotation of a platen roller.

One or more aspects of the disclosure provides a printing cassette that is attached to a printer main body, the printer main body including a print head, a platen roller facing the print head, and a drive source configured to cause the platen roller to rotate.

The printing cassette includes a first tape on which printing is performed by the print head, an input unit that is rotatable around a rotation axis thereof and is transmitted a driving force from the drive source, and an output unit that is rotatable around a rotation axis thereof and is configured to transmit to the platen roller the driving force that is transmitted to the input unit. The first tape is conveyed by the platen roller in a state where the printing cassette is attached to the printer main body.

Another aspect of the disclosure provides a printer including a printing cassette and a printer main body toward which the printing cassette is attached. The printer main body includes a print head, a platen roller facing the print head, and a drive source configured to cause the platen roller to rotate.

According to one or more aspects of the disclosure, the driving force from the driving source is transmitted to the platen roller via each of the input unit and the output unit in the printing cassette. That is, the driving force is transmitted to the platen roller only in a state where the printing cassette is attached to the printer main body. Thus, unexpected rotation of the platen roller in a state where the printing cassette is not attached may be suppressed.

Another aspects of the disclosure provides a printing cassette that is attached to a printer main body, the printer main body including a print head, a platen roller facing the print head, a driving source configured to cause the platen roller to rotate, and a driving force transmission member displaceable between a transmission state in which a driving force is transmitted from the driving source to the platen roller and a non-transmission state in which the driving force is not transmitted from the driving source to the platen roller.

The printing cassette includes a first tape on which printing is performed by the print head, and a contact portion that is configured to contact the driving force transmission member such that the driving force transmission member is displaced between the transmission state and non-transmission state. In a state where the printing cassette is attached to the printer main body, the contact portion contacts the driving force transmission member, and the first tape is conveyed by the platen roller.

Another aspect of the disclosure provides a printer including a printing cassette and a printer main body toward which the printing cassette is attached. The printer main body includes a print head, a platen roller facing the print head, a drive source configured to cause the platen roller to rotate, and a driving force transmission member displaceable between a transmission state in which a driving force is transmitted from the driving source to the platen roller and a non-transmission state in which the driving force is not transmitted from the driving source to the platen roller.

According to one or more aspects of the disclosure, the driving force transmission member is displaced from the non-transmission state to the transmission state by the contact of the contact portion, whereby the driving force is transmitted to the platen roller only in a state where the printing cassette is attached to the printer main body. Thus, unexpected rotation of the platen roller in a state where the printing cassette is not attached may be suppressed.

DETAILED DESCRIPTION

First Embodiment 1-1. Configuration

Figure 1:
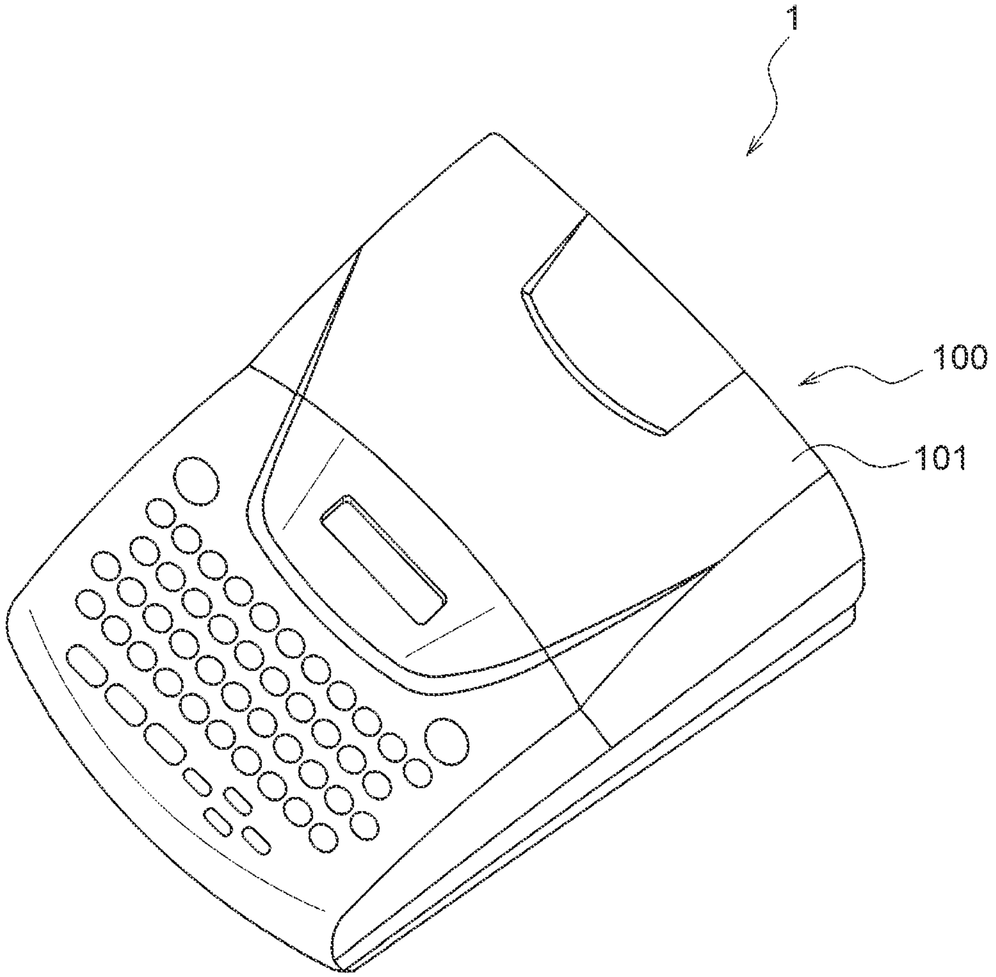
FIG. 1 is a schematic perspective view of an printer according to an illustrative embodiment of the disclosure.
Figure 2A:
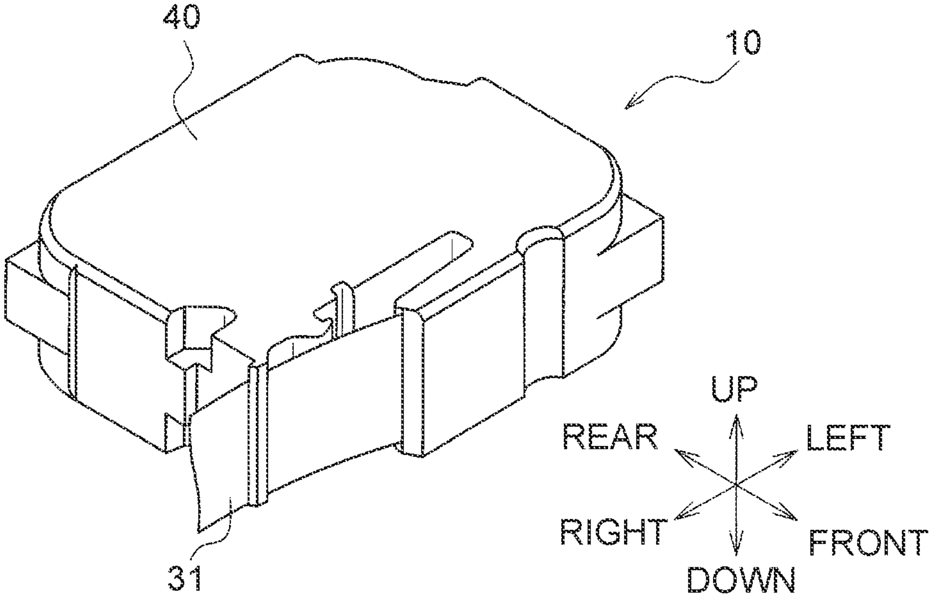
FIG. 2A is a schematic perspective view of a printing cassette in the printer of FIG. 1.

The printer 1 in FIG. 1 includes a printing cassette 10 as illustrated in FIG. 2A and a main body 100. The printer 1 is an apparatus that performs printing on a tape-shaped printing medium.

Main Body

Figure 2B:
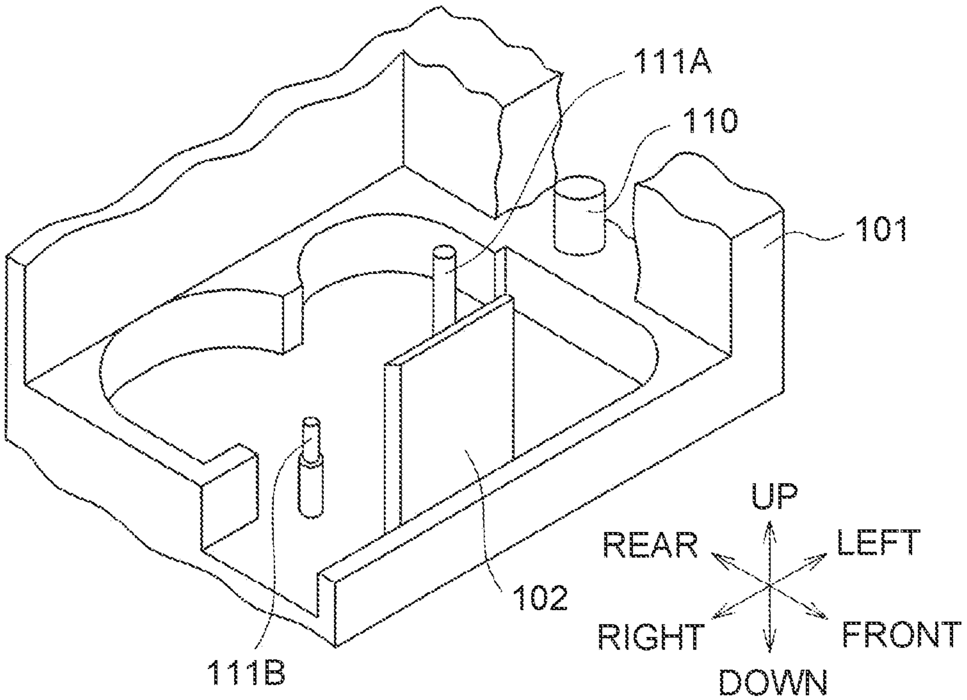
FIG. 2B is a schematic perspective view of a main body in the printer of FIG. 1.
Figure 3:
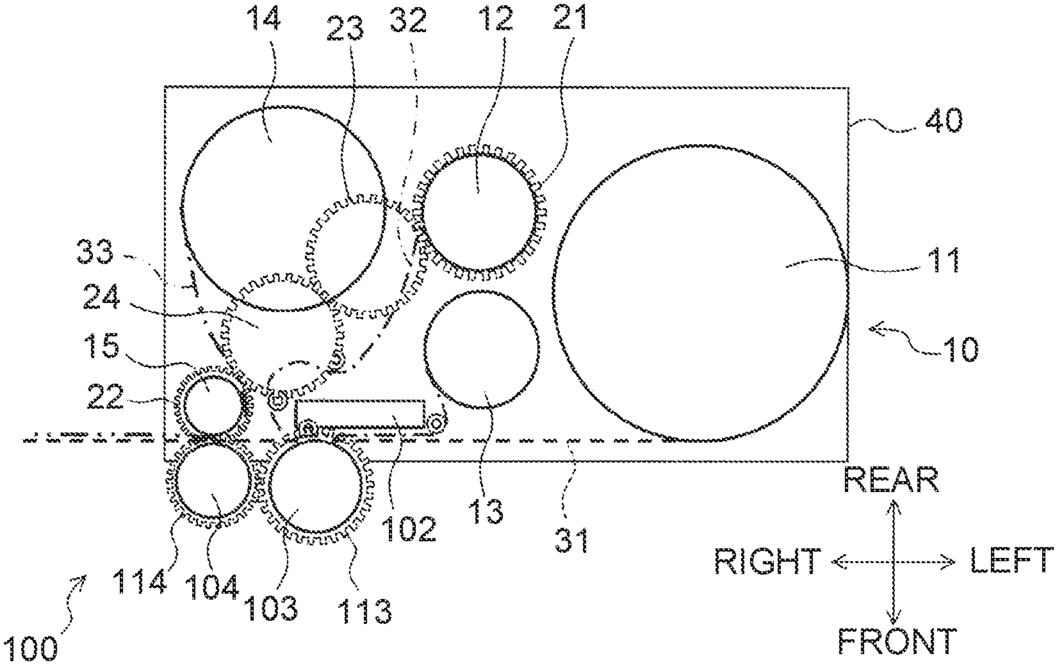
FIG. 3 is a schematic diagram illustrating conveying configuration of a tape in the printer of FIG. 1.

As illustrated in FIG. 2B, the main body 100 includes a housing 101, a print head 102, a drive source 110, a first drive shaft 111A, and a second drive shaft 111B. As illustrated in FIG. 3, the main body 100 includes a platen roller 103, a pressing roller 104, a platen gear 113, and a pressing gear 114.

In this embodiment, the axial direction of the platen roller 103 is referred to as an up-down direction, a direction orthogonal to the up-down direction in which the platen roller 103 and the print head 102 face each other is referred to as a front-rear direction, and a direction orthogonal to both the up-down direction and the front-rear direction is referred to as a left-right direction.

Housing

As illustrated in FIG. 2B, the housing 101 has a recessed portion in which the printing cassette 10 is mounted in the up-down direction. The housing 101 has a function for positioning the printing cassette 10 therein.

Print Head

The print head 102 is a device for printing on a printing tape (an example of a first tape) held by the printing cassette 10.

The print head 102 is disposed at a position overlapping the printing tape and the ink ribbon in the front-rear direction in a state where the printing cassette 10 is attached to the main body 100. The print head 102 has a plurality of heating elements that individually control heat generation.

The printing tape conveyed to a position overlapping the print head 102 by the platen roller 103 is pressed, via the ink ribbon, against the print head 102 in which the heating elements have generated heat. Accordingly, a portion of ink disposed on the surface of the ink ribbon is transferred to the printing tape, and characters, symbols, and the like are printed on the printing tape.

Drive Source

The driving source 110 rotationally drives the platen roller 103. For example, a motor can be used as the driving source 110.

Driving Shaft

The first driving shaft 111A and the second driving shaft 111B are inserted into the printing cassette 10 to input the driving force generated by the driving source 110 to the printing cassette 10. Central axes of the driving shafts 111A and 111B are parallel to the up-down direction.

Platen Roller

As illustrated in FIG. 3, the platen roller 103 is a roller for conveying the printing tape from inside to outside of the printing cassette 10. The rotation axis of the platen roller 103 is parallel to the up-down direction.

The platen roller 103 is disposed at a position facing the print head 102 in the housing 101. The platen roller 103 contacts the printing tape and presses the printing tape against the print head 102.

Pressing Roller

The pressing roller 104 presses a laminate tape (an example of a second tape) against the printed printing tape together with the bonding roller 15 of the printing cassette 10. The rotation axis of the pressing roller 104 is parallel to the up-down direction.

Platen Gear

The platen gear 113 is coupled to the platen roller 103. In this embodiment, the platen gear 113 is engaged with the pressing gear 114. The platen gear 113 rotates the platen roller 103 by the driving force transmitted from the pressing gear 114.

Pressing Gear

The pressing gear 114 is coupled to the pressing roller 104. In this embodiment, the pressing gear 114 is engaged with the platen gear 113. Nevertheless, since the pressing roller 104 rotates as the printing tape 31 is conveyed, the pressing gear 114 may not necessarily be coupled to the pressing roller 104.

In a state where the printing cassette 10 is attached to the main body 100, the pressing gear 114 is engaged with the laminating gear 22 of the printing cassette 10. The pressing gear 114 transmits to the platen gear 113 the driving force that is transmitted from the laminating gear 22.

Printing Cassette

The printing cassette 10 stores printing media therein. The printing cassette 10 is attachable to and detachable from the main body 100. The printing medium may be replenished and the type of the printing medium (e.g., color, material) may be changed by replacing the printing cassette 10.

The printing cassette 10 includes a first feed spool 11, a take-up spool 12, a second feed spool 13, a third feed spool 14, a laminating roller 15, a main gear 21, a laminating gear 22, a first cassette side transmission gear 23, a second cassette side transmission gear 24, a printing tape 31, an ink ribbon 32, a laminate tape 33, and a case 40.

First Feed Spool

The first feed spool 11 is rotatable about a rotation axis parallel to the up-down direction. The first feed spool 11 rotates as the printing tape 31 is conveyed by the platen roller 103, thereby supplying the printing tape 31 to the print head 102.

Take-Up Spool

The take-up spool 12 is rotatable about a rotation axis. The rotation axis of the take-up spool 12 is parallel to the rotation axis of the first feed spool 11.

Figure 4A:
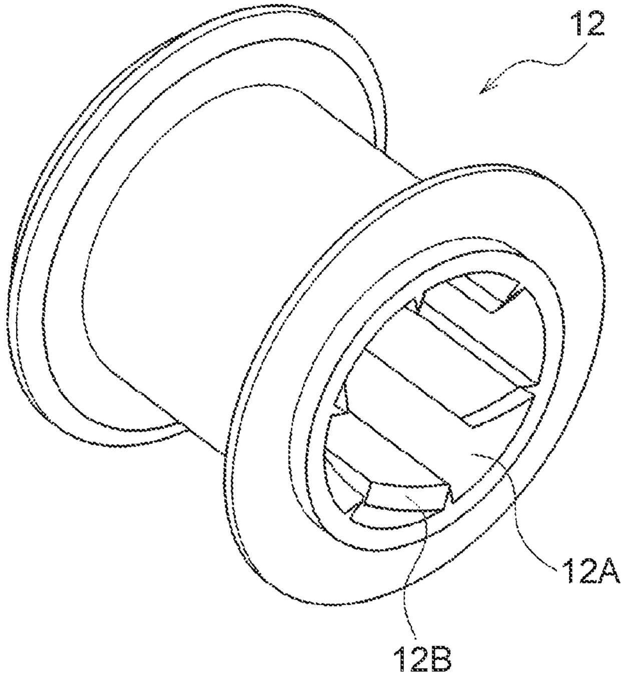
FIG. 4A is a schematic perspective view of a take-up spool in the printing cassette of FIG. 2.

As illustrated in FIG. 4A, the take-up spool 12 is cylindrical and has a hollow portion defined by an inner peripheral surface 12A. An inner peripheral surface 12A of the take-up spool 12 has a spline teeth 12B. The spline teeth 12B is connected to the first driving shaft 111A. The take-up spool 12 is rotatable by the first driving shaft 111A to take up the ink ribbon 32.

Second Feed Spool

As illustrated in FIG. 3, the second feed spool 13 is rotatable about a rotation axis. The rotation axis of the second feed spool 13 is parallel to the rotation axis of the first feed spool 11. The second feed spool 13 supplies the ink ribbon 32 to the print head 102 by rotating as the take-up spool 12 takes up the ink ribbon 32.

Third Feed Spool

The third feed spool 14 is rotatable about a rotation axis. The rotation axis of the third feed spool 14 is parallel to the rotation axis of the first feed spool 11. The third feed spool 14 rotates as the laminating roller 15 and the pressing roller 104 convey the laminate tape 33, thereby feeding out the laminate tape 33.

Laminating Roller

The laminating roller 15, together with the pressing roller 104, presses the laminate tape 33 against the printing tape 31 that has been used for printing, thereby laminating the printing tape 31 and the laminate tape 33. The laminating roller 15 is disposed downstream of the print head 102 in the conveying direction of the printing tape. The rotation axis of the pressing roller 15 is parallel to the up-down direction.

Main Gear

The main gear 21 is an input portion that rotates about a rotation axis and receives a driving force from the driving source 110.

Figure 4B:
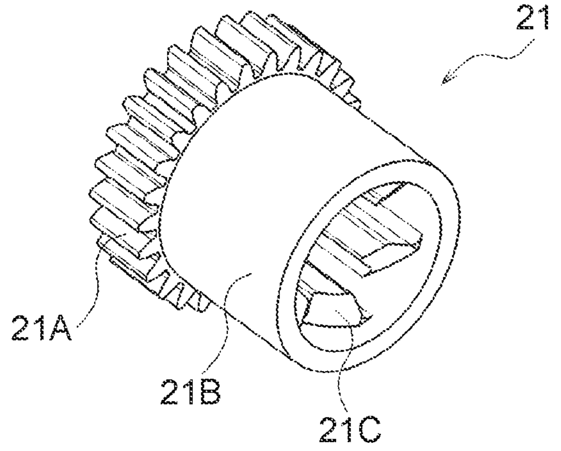
FIG. 4B is a schematic perspective view of a main gear in the printing cassette of FIG. 2.

As illustrated in FIG. 4B, the main gear 21 includes a gear body 21A and a cylindrical spool 21B. The cylindrical spool 21B is fixed to the gear body 21A and has spline teeth 21B on an inner peripheral surface thereof. The gear body 21A rotates integrally with the spool 21B by the driving force input to the spool 21B.

The rotational axis of the main gear 21 (i.e., the rotational axis of the gear body 21A and the rotational axis of the spool 21B) is on the same straight line as the rotational axis of the take-up spool 12. That is, the rotational axis of the main gear 21 passes through the hollow portion of the take-up spool 12.

Thus, the first driving shaft 111A is simultaneously inserted through the take-up spool 12 and the main gear 21. Accordingly, the main gear 21 is not directly connected to the take-up spool 12, but the main gear 21 and the take-up spool 12 are commonly rotatable by the drive source 110.

In this embodiment, the main gear 21 is engaged with the first cassette side transmission gear 23. The main gear 21 transmits, via the first cassette side transmission gear 23 and the second cassette side transmission gear 24, the driving force of the first drive shaft 111A to the laminating gear 22.

Laminating Gear

The laminating gear 22 is an output portion that rotates around a rotation axis and transmits to the platen roller 103 the driving force that is transmitted to the main gear 21.

The rotation axis of the laminating gear 22 is parallel to the up-down direction. The rotation axis of the main gear 21 and the rotation axis of the laminating gear 22 are located on different straight lines from each other. That is, the main gear 21 and the laminating gear 22 are located at different positions in the front-rear direction and the left-right direction.

The laminating gear 22 is connected to the laminating roller 15. In this embodiment, the main gear 22 is engaged with the second cassette side transmission gear 24. In a state where the printing cassette 10 is attached to the main body 100, the laminating gear 22 is engaged with the pressing gear 114.

The laminating gear 22 rotates the laminating roller 15 by the driving force transmitted from the second cassette side transmission gear 24, and transmits the driving force to the pressing gear 114. Nevertheless, since the laminating roller 15 rotates as the laminating tape 33 is laminated on the conveyed printing tape 31, the laminating gear 22 may not necessarily be connected to the laminating roller 15.

Cassette Side Transmission Gear

The first cassette side transmission gear 23 and the second cassette side transmission gear 24 performs a cassette side transmission mechanism that transmits the driving force input to the main gear 21 to the laminating gear 22.

The first cassette side transmission gear 23 is engaged with the main gear 21 and the second cassette side transmission gear 24. The second cassette side transmission gear 24 is engaged with the first cassette side transmission gear 23 and the laminating gear 22.

The cassette side transmission mechanism may be performed by one gear, or three or more gears. The cassette side transmission mechanism may include another configuration such as a roller and a belt.

Printing Tape

The print head 102 and the ink ribbon 32 performs printing on the surface of the printing tape 31. The printing tap 31 is wound around the first feed spool 11. The printing tape 31 is conveyed by the platen roller 103 in a state where the printing cassette 10 is attached to the main body 100, and is pulled out from the first feed spool 11.

Ink Ribbon

The ink ribbon 32 is superposed on the printing tape 31 and used for printing by the print head 102. The ink ribbon 32 is wound around the second feed spool 13, and is pulled out from the second feed spool 13 by being taken up by the take-up spool 12.

Laminate Tape

The laminate tape 33 is used to protect the printing tape 31. The laminate tape 33 has an adhesive surface to be laminated to the printing tape 31 on which printing has been performed by the print head 102.

The laminate tape 33 is wound around the third feed spool 14. The laminating tape 33 is pulled out from the third feed spool 14 and is laminated to the printing tape 31 by the laminating roller 15.

Case

The case 40 stores at least part of the printing tape 31, at least part of the ink ribbon 32, at least part of the laminate tape 33, at least part of the main gear 21, and at least part of the laminating gear 22 therein.

Transmission of Driving Force

In a state where the printing cassette 10 is attached to the main body 100, the first drive shaft 11A engages with the main gear 21, and the pressing gear 114 engages with the laminating gear 22.

In this state, the main gear 21 is rotated by the first drive shaft 111A that causes the laminating gear 22 to rotate, whereby the pressing gear 114 and the platen gear 113 rotates. Accordingly, the platen roller 103 rotates and the printing tape 31 is conveyed.

In a state where the printing cassette 10 is not attached to the main body 100, the driving force from the driving source 110 is not transmitted to the platen gear 113, and thus the platen roller 103 does not rotate.

First Modification

In this embodiment, the laminating roller 15 may have an engagement portion for engaging with the second drive shaft 111B. The laminating roller 15 having the engagement portion may perform as an input portion to which the driving force of the drive source 110 is transmitted.

In the case where the laminating roller 15 performs as the input portion, the take-up spool 12 and the main gear 21 are connected to each other, and the first drive shaft 111A does not engage with the take-up spool 12 and the main gear 21, so that the take-up spool 12 is rotated by the driving force input from the laminating roller 15. That is, only the laminating roller 15 performs as the input portion of the printing cassette 10.

1-2. Effect

According to this embodiment, following effects are obtained.

(1a) The driving force from the driving source 110 is transmitted to the platen roller 103 via the input portion, i.e., the main gear 21, and the output portion, i.e., the laminating gear 22, in the printing cassette 10. That is, the driving force is transmitted to the platen roller 103 only in a case where the printing cassette 10 is attached to the main body 100. Thus, unexpected rotation of the platen roller 103 in a state where the printing cassette 10 is not attached can be suppressed.

For example, in a case where a jammed printing tape 31 is caught by the platen roller 103 while the driving force of the driving source is transmitted to the platen roller 103, it is difficult to forcibly rotate the platen roller 103 and remove the jammed print-receiving tape 31. On the other hand, according to this embodiment, since the transmission of the driving force from the driving source 110 to the platen roller 103 is interrupted by removing the printing cassette 10 from the main body 100, the jammed printing tape 31 can be easily removed.

(1b) The driving force can be transmitted from the single driving shaft 111 to the take-up spool 12 and the main gear 21. Thus, a driving force can be input to each of the take-up spool 12 and the main gear 21 while suppressing an enlargement of the printing cassette 10 in a direction orthogonal to an insertion direction of the driving shaft 111, i.e. the front-rear direction and the left-right direction.

2. Second Embodiment 2-1. Configuration

A printer of the second embodiment is different from the printer of the first embodiment by changing arrangement of gears in a printing cassette and a printer. Description of the configuration common to the first embodiment will be omitted.

Figure 5:
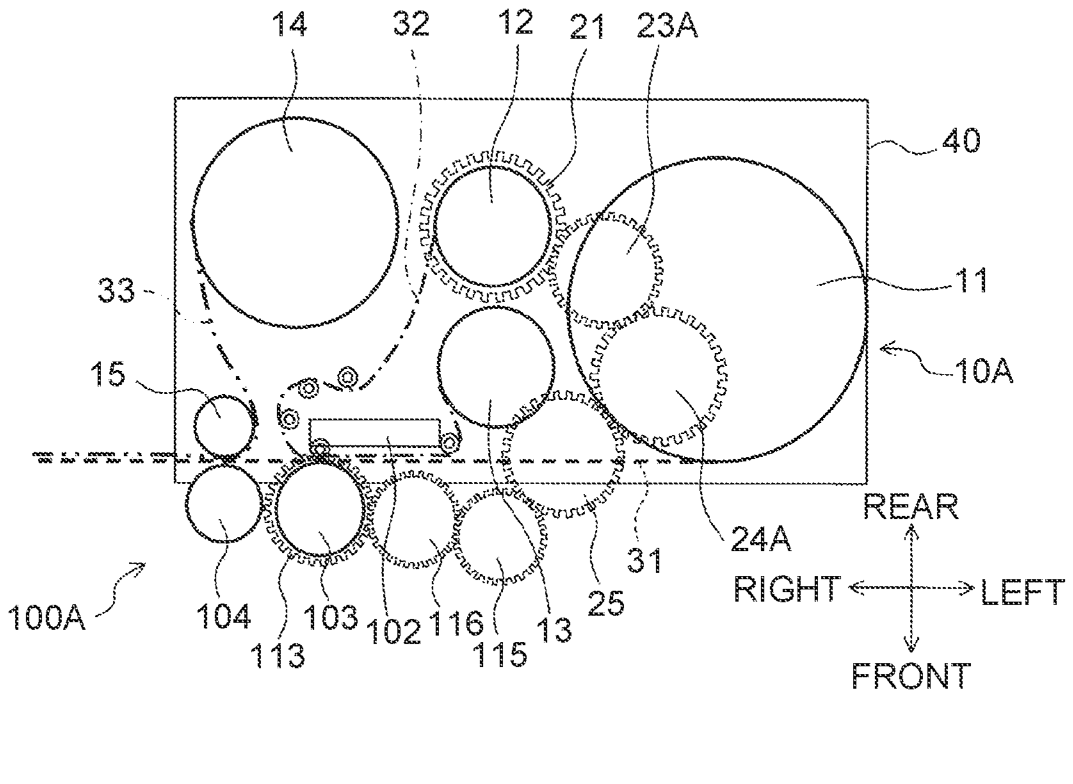
FIG. 5 is a schematic diagram illustrating conveying configuration of a tape in the printer according to another illustrative embodiment of the disclosure different from the illustrative embodiment of FIG. 3.

As illustrated in FIG. 5, a main body 100A of the second embodiment includes a first main body side transmission gear 115 and a second main body side transmission gear 116 that are added to the main body 100 of the first embodiment.

The first main body side transmission gear 115 and the second main body side transmission gear 116 perform as a main body side transmission mechanism that transmits driving force output from the output gear 25 of a printing cassette 10A to the platen gear 113. The first main body side transmission gear 115 is engaged with the second main body side transmission gear 116. The second main body side transmission gear 116 is engaged with the first main body side transmission gear 115 and the platen gear 113.

The main body side transmission mechanism may be performed by one gear, or three or more gears. The main body side transmission mechanism may include another configuration such as a roller and a belt.

The printing cassette 10A of the second embodiment differs from the printing cassette 10 of the first embodiment in points that the printing cassette 10A includes an output gear 25, a first cassette side transmission gear 23A, and a second cassette side transmission gear 24A in place of the laminating gear 22, the first cassette side transmission gear 23, and the second cassette side transmission gear 24.

The output gear 25 is an output portion that rotates around a rotation axis and transmits to the platen roller 103 the driving force that is transmitted to the main gear 21. The rotation axis of the main gear 21 and the rotation axis of the output gear 25 are located on different straight lines from each other. A part of the output gear 25 protrudes from the case 40 in a direction orthogonal to the rotation axis of the output gear 25, i.e., the front-rear direction.

In this embodiment, the output gear 25 is engaged with the second cassette side transmission gear 24A. The second cassette side transmission gear 24A is engaged with the main gear 21 via the first cassette side transmission gear 23A. In a state where the printing cassette 10A is attached to the main body 100A, the output gear 25 engages with the first main body side transmission gear 115.

The output gear 25 transmits the driving force transmitted from the main gear 21 via the first cassette side transmission gear 23A and the second cassette side transmission gear 24A, to the platen gear 113 via the first main body side transmission gear 115 and the second main body side transmission gear 116.

2-2. Effect

According to this embodiment, following effects are obtained.

(2A) According to the transmission mechanism that is performed by the first main body side transmission gear 115 and the second main body side transmission gear 116 in the main body 100A, it is possible to reduce the size of the printing cassette 10A.

Third Embodiment 3-1. Configuration

A printer of the third embodiment is different from the printer of the second embodiment by changing arrangement of gears in a printing cassette and a printer. Description of the configuration common to the second embodiment will be omitted.

Figure 6A:
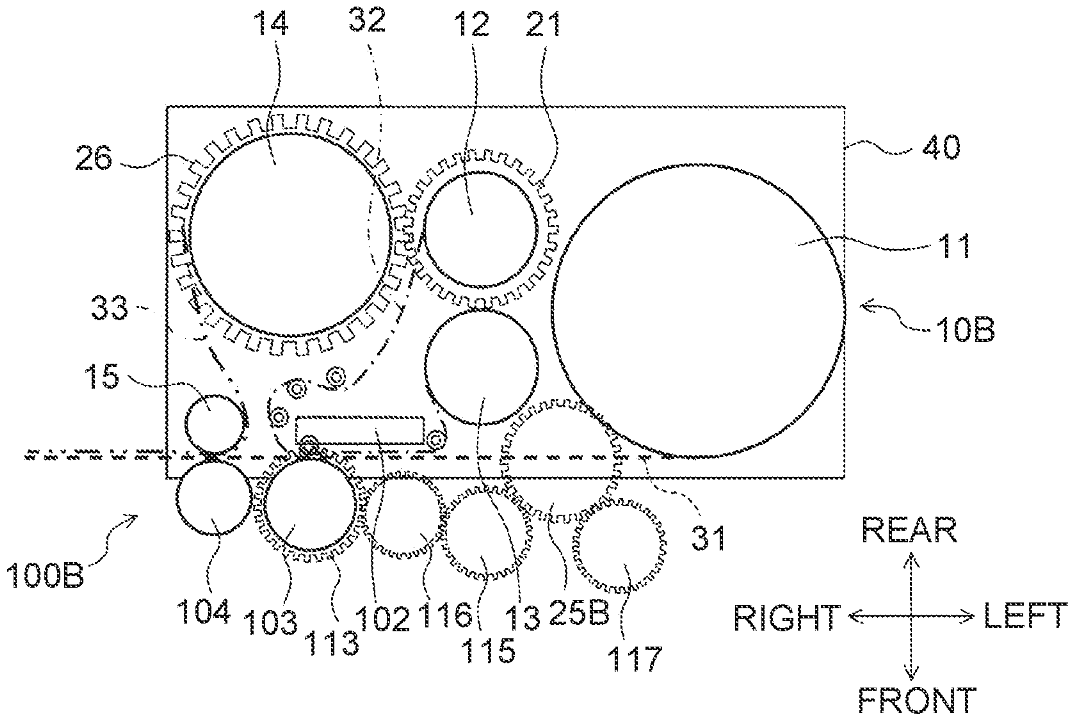
FIG. 6A is a schematic diagram illustrating a conveying configuration of a tape in a printer according to an illustrative embodiment different from the illustrative embodiments of FIGS. 3 and 5.

As illustrated in FIG. 6A, a main body 100B of the third embodiment includes a driving force input gear 117 that is added to the main body 100A of the second embodiment. The driving force input gear 117 is connected to a driving source 110. The main body 100B of the third embodiment does not include the driving shafts 111A and 111B.

In a state where the printing cassette 10B is attached to the main body 100B, the driving force input gear 117 engages with the output gear 25B of the printing cassette 10B and transmits the driving force of the driving source 110 to the output gear 25B.

The printing cassette 10B of the second embodiment differs from the printing cassette 10A of the second embodiment in that the printing cassette 10B includes an output gear 25B and a supply gear 26 in place of the output gear 25, the first cassette side transmission gear 23A and the second cassette side transmission gear 24A.

The output gear 25B is a single gear that rotates about a rotation axis parallel to the up-down direction. The output gear 25B is an input portion to which the driving force of the driving source 110 is transmitted from the driving force input gear 117, and is an output portion for transmitting the driving force transmitted thereto to the platen roller 103.

That is, the output gear 25B is a rotary body that performs as both of the input portion and the output portion. The rotation axis of the input portion and the rotation axis of the output portion are on the same straight line. A part of the output gear 25 protrudes from the case 40 in a direction orthogonal to the rotation axis of the output gear 25B, i.e., the front-rear direction.

Figure 6B:
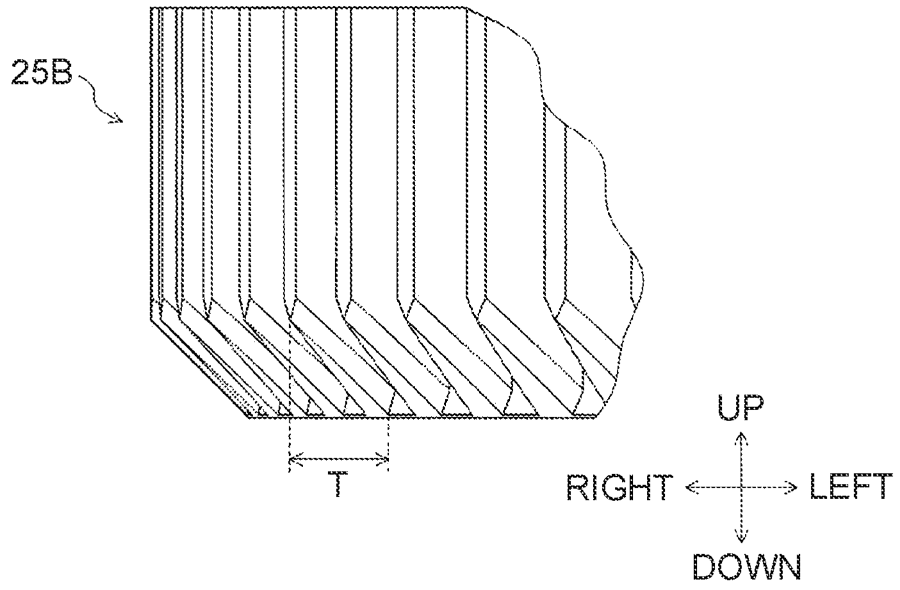
FIG. 6B is a schematic partial perspective view of teeth of an output gear.

The rotation axis of the output gear 25B is parallel to a direction in which the printing cassette 10B is attached to the main body 100B. As illustrated in FIG. 6B, a total tooth depth T of the output gear 25B is less along the direction in which the printing cassette 10B is attached to the main body 100B, i.e., downward in the up-down direction. This makes it easy to insert the printing cassette 10B into the main body 100B and to engage the output gear 25B with the driving force input gear 117 and the first body side transmission gear 115.

The feed gear 26 is coupled to the third feed spool 14 and is engaged with the main gear 21. The feed gear 26 transmits rotation of the third feed spool 14, which rotates as the laminate tape 33 is pulled out, to the main gear 21 coupled to the take-up spool 12.

In a state where the printing cassette 10B is attached to the main body 100B, the output gear 25B engages with the first main body side transmission gear 115. The output gear 25B transmits to the first main body side transmission gear 115 the driving force that is transmitted from the driving force input gear 117.

3-2. Effect

According to this embodiment, following effects are obtained.

(3a) Since a driving force for rotating the take-up spool 12 may not necessarily be input to the printing cassette 10B, the structure of the printer may be simplified.

4. Fourth Embodiment 4-1. Configuration

A printer of the fourth embodiment is different from the printer of the third embodiment by changing arrangement of gears in a printing cassette and a printer. Description of the configuration common to the first embodiment will be omitted.

Figure 7:
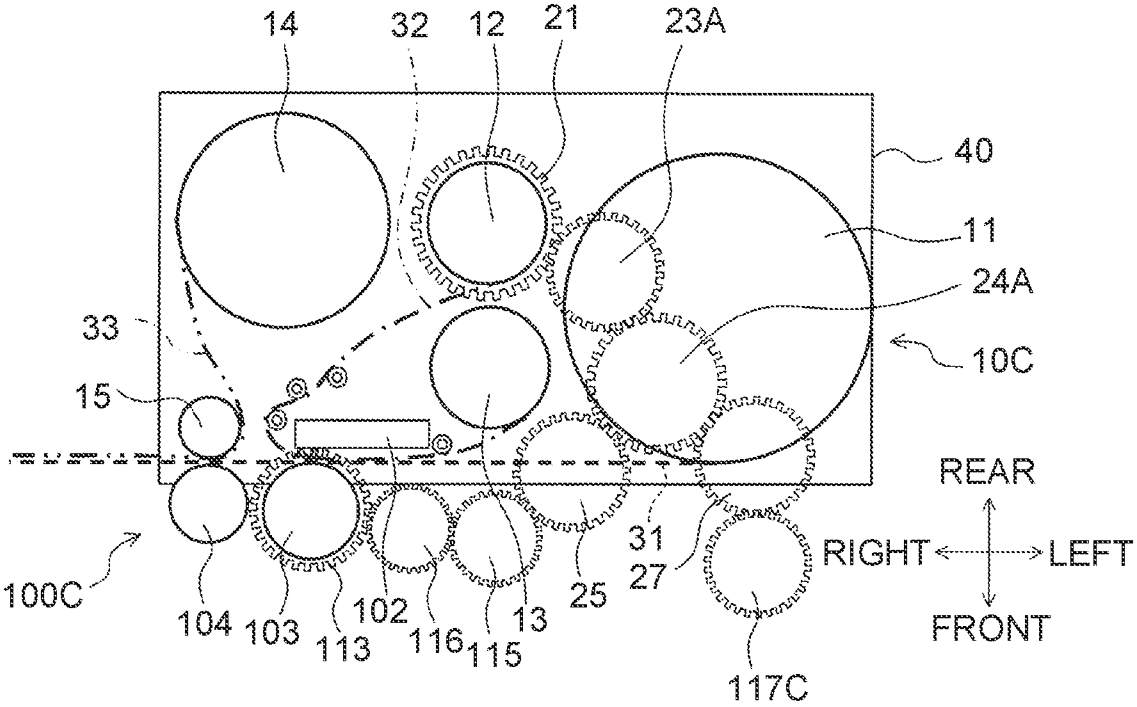
FIG. 7 is a schematic diagram illustrating conveying configuration of a tape in the printer according to another illustrative embodiment of the disclosure different from the illustrative embodiments of FIGS. 3, 5 and 6A.

As illustrated in FIG. 7, a main body 100C of the fourth embodiment includes a driving force input gear 117C in place of the driving force input gear 117 in the main body 100B of the third embodiment.

In a state where the printing cassette 10C is attached to the main body 100C, the driving force input gear 117C engages with the input gear 27 of the printing cassette 10C and transmits the driving force of the driving source 110 to the input gear 27.

The printing cassette 10C of the fourth embodiment differs from the printing cassette 10B of the third embodiment in that the printing cassette 10C includes an output gear 25, a first cassette side transmission gear 23A, a second cassette side transmission gear 24A and an input gear 27 in place of the output gear 25B and the feed gear 26.

The output gear 25, the first cassette side transmission gear 23A, and the second cassette side transmission gear 24A are the same as those of the printing cassette 10A of the second embodiment. The input gear 27 is engaged with the second cassette side transmission gear 24A. The input gear 27 is an input portion that rotates around a rotational axis and to which the driving force of the driving source 110 is transmitted from the driving force input gear 117C.

In a state where the printing cassette 10C is attached to the main body 100C, the output gear 25 engages with the first main body side transmission gear 115, and the input gear 27 engages with the driving force input gear 117C. The output gear 25B transmits to the first main body side transmission gear 115 the driving force that is transmitted from the driving force input gear 117C via the input gear 27.

4-2. Effect

According to this embodiment, following effects are obtained.

(4a) Since the driving force may be simultaneously transmitted from the input gear 27 to the take-up spool 12 and the platen gear 113, the structure of the printer may be simplified.

5-1. Configuration

A printer of the fifth embodiment is different from the printer of the first embodiment by changing arrangement of gears in a printing cassette and a printer. Description of the configuration common to the first embodiment will be omitted.

Figure 8:
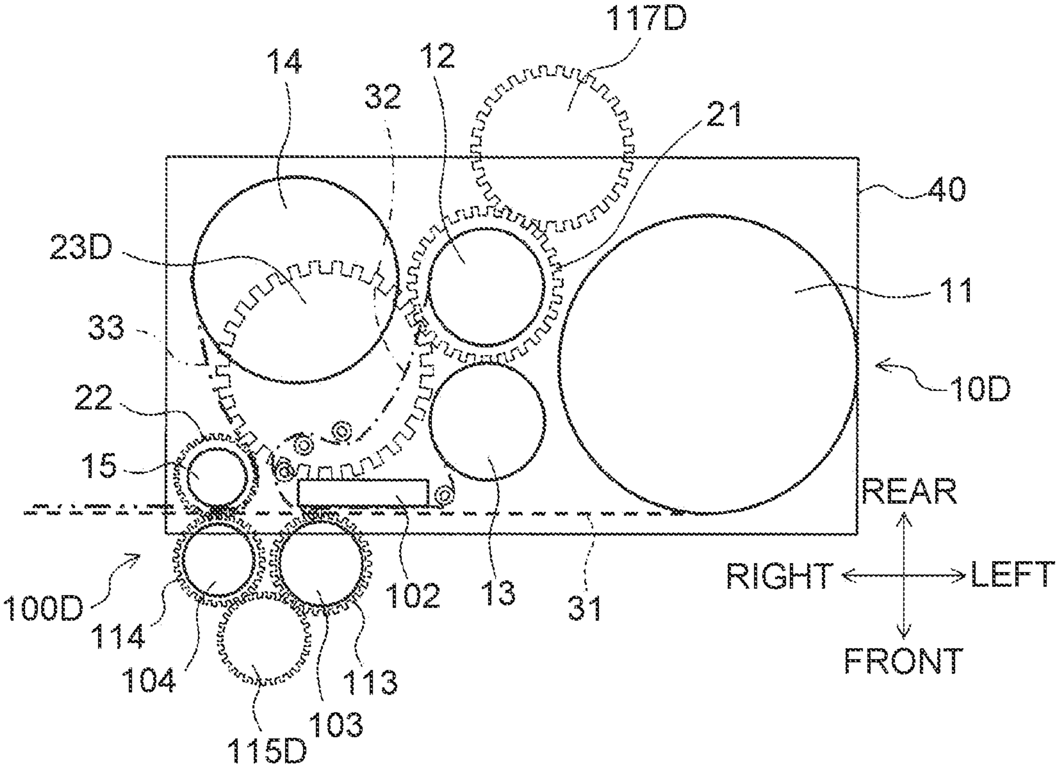
FIG. 8 is a schematic diagram illustrating conveying configuration of a tape in the printer according to another illustrative embodiment of the disclosure different from the illustrative embodiments of FIGS. 3, 5 and 7.

As illustrated in FIG. 8, a main body 100D of the fifth embodiment includes a driving force input gear 117D and a main body side transmission gear 115D that are added to the main body 100 of the first embodiment. The driving force input gear 117D is connected to a driving source 110. The main body 100D of the fifth embodiment does not include the driving shafts 111A and 111B.

In a state where the printing cassette 10D is attached to the main body 100D, the driving force input gear 117D engages with the main gear 21 of the printing cassette 10D and transmits the driving force of the driving source 110 to the main gear 21.

The driving force input gear 117D is located at a position overlapping the printing cassette 10D in the up-down direction. That is, in a state where the printing cassette 10D is attached to the main body 100D, a part of the driving force input gear 117D is located in the case 40 of the printing cassette 10D.

The main body side transmission gear 115D is engaged with the pressing gear 114 and the platen gear 113. The main body side transmission gear 115D transmits to the platen gear 113 the driving force that is transmitted from the pressing gear 114.

The printing cassette 10D of the fifth embodiment differs from the printing cassette 10 of the first embodiment in that the printing cassette 10D includes a cassette side transmission gear 23D in place of the first cassette side transmission gear 23 and the second cassette side transmission gear 24. The cassette side transmission gear 23D is engaged with the main gear 21 and the laminating gear 22. The take-up spool 12 is connected to the main gear 21.

In a state where the printing cassette 10D is attached to the main body 100D, the laminate gear 22 engages with the pressing gear 114, and the main gear 21 engages with the driving force input gear 117D. The laminate gear 22 transmits to the pressing gear 114 the driving force that is transmitted from the driving force input gear 117D via the main gear 21.

5-2. Effect

According to this embodiment, following effects are obtained.

(5a) By engaging the driving force input gear 117D with the main gear 21 in place of the driving shaft, degree of freedom of arrangement of members in the printing cassette 10D and the main body 100D may increase.

6-1. Configuration

A printer of the sixth embodiment is different from the printer of the fifth embodiment by changing arrangement of gears in a printing cassette and a printer. Description of the configuration common to the fifth embodiment will be omitted.

Figure 9:
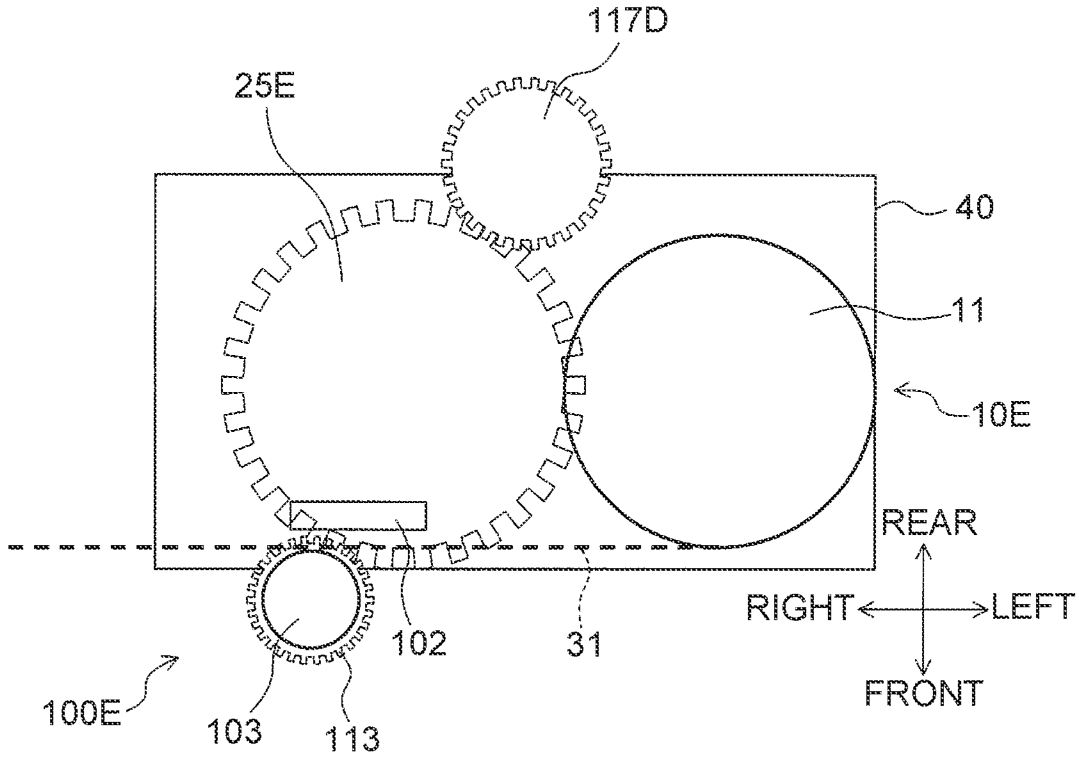
FIG. 9 is a schematic diagram illustrating conveying configuration of a tape in the printer according to another illustrative embodiment of the disclosure different from the illustrative embodiments of FIGS. 3, 5 and 8.

As illustrated in FIG. 9, the main body 100E of the sixth embodiment is the same as the main body 115D of the fifth embodiment except that the main body 100E does not include the pressing roller 104, the pressing gear 114, and the main body side transmission gear 100D.

The printing cassette 10E of the sixth embodiment differs from the printing cassette 10D of the fifth embodiment in that the printing cassette 10E includes an output gear 25E that performs as both of the input portion and the output portion in place of the take-up spool 12, the second feed spool 13, the third feed spool 14, the laminating roller 15, the main gear 21, the laminating gear 22, the cassette side transmission gear 23D, the ink ribbon 32 and the laminate tape 33.

The output gear 25E is entirely located inside the case 40 of the printing cassette 10E. In the printing cassette 10E, thermal paper is used as the printing tape 31.

In a state where the printing cassette 10E is attached to the main body 100E, the output gear 25E engages with the platen gear 113 and the driving force input gear 117D. The output gear 25E transmits to the platen gear 113 the driving force that is transmitted from the driving force input gear 117D.

6-2. Effect

According to this embodiment, following effects are obtained.

(6a) By using the output gear 25E that performs as both of the input portion and the output portion, an internal structure of the printing cassette 10E may be simplified.

7. Seventh Embodiment 7-1. Configuration

Figure 10A:
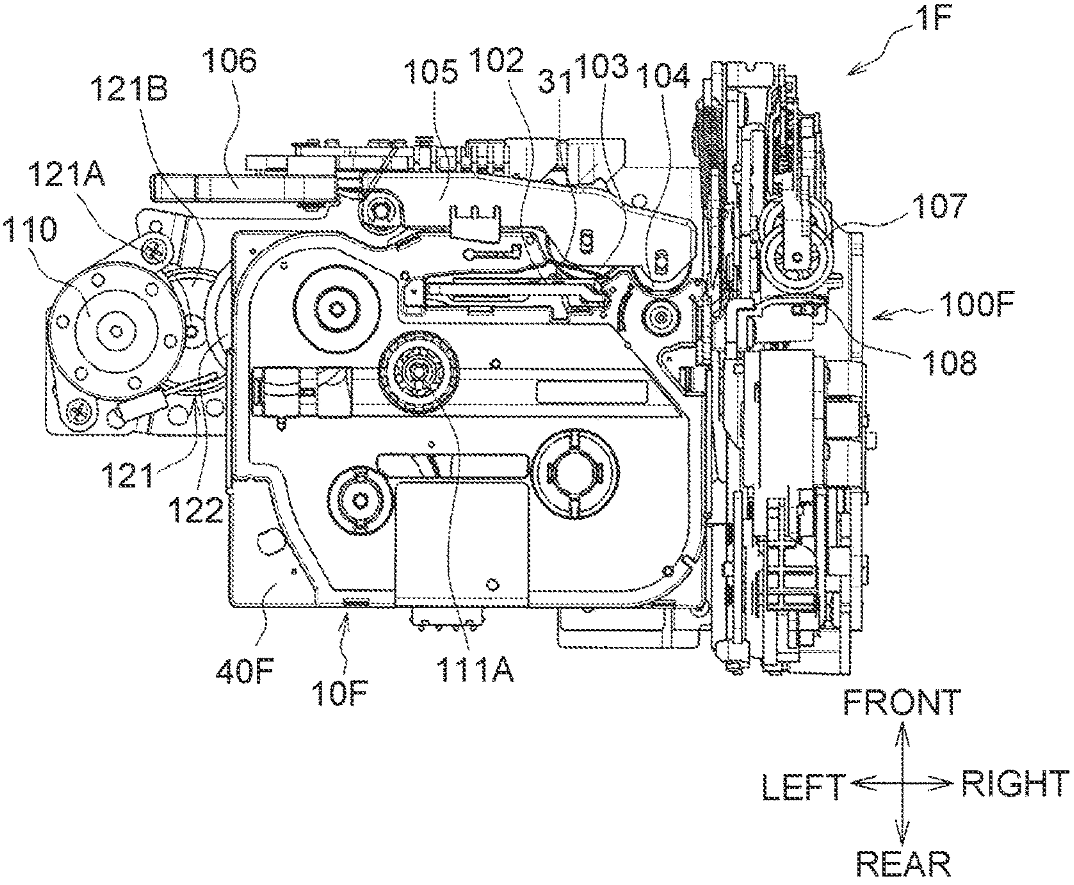
FIG. 10A is a schematic plane view of the printer according to another embodiment of the disclosure different from the illustrative embodiment of FIG. 1.
Figure 10B:
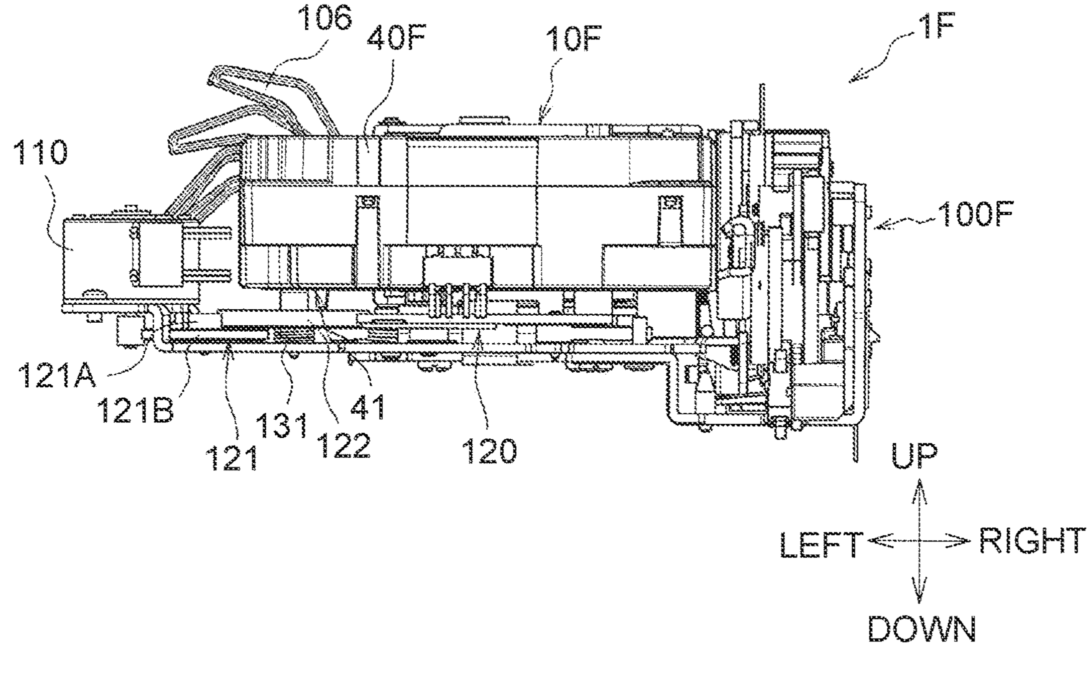
FIG. 10B is a schematic front view of the printer of FIG. 10A.

As illustrated in FIGS. 10A and 10B, a printer 1F includes a printing cassette 10F and a main body 100F.

Main Body

Figure 11A:
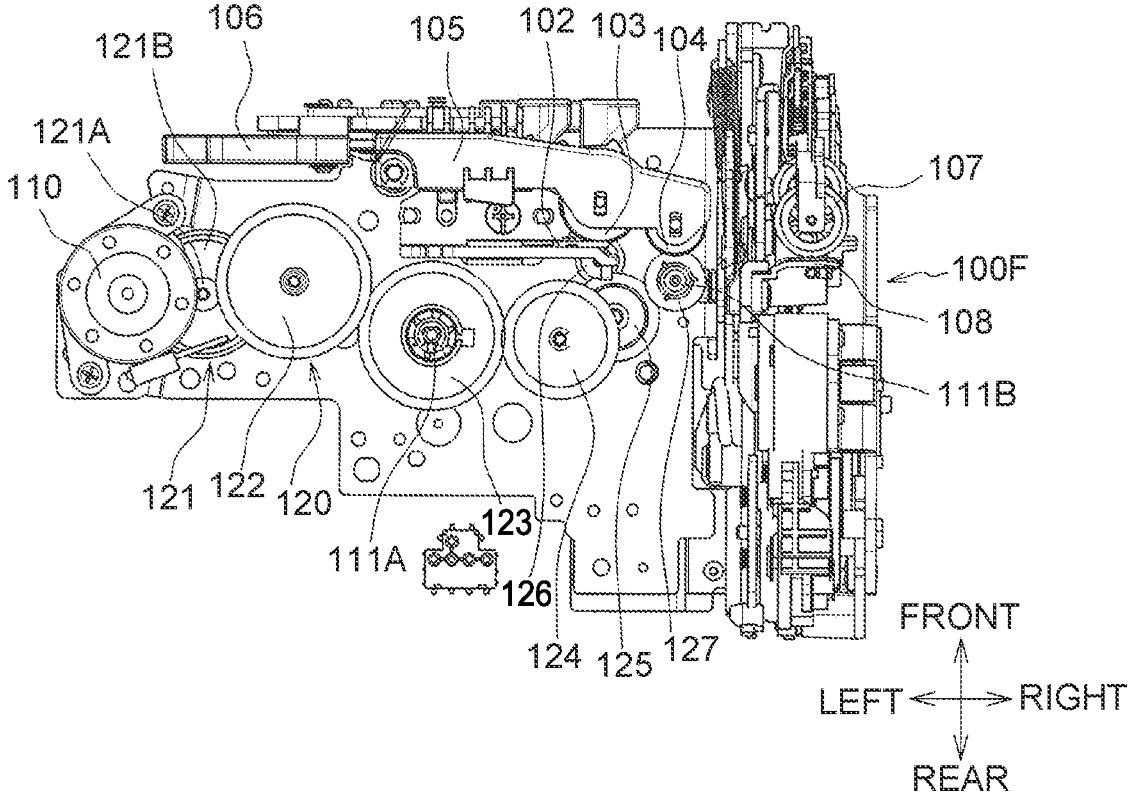
FIG. 11A is a schematic plan view of the main body in the printer of 10A.
Figure 11B:
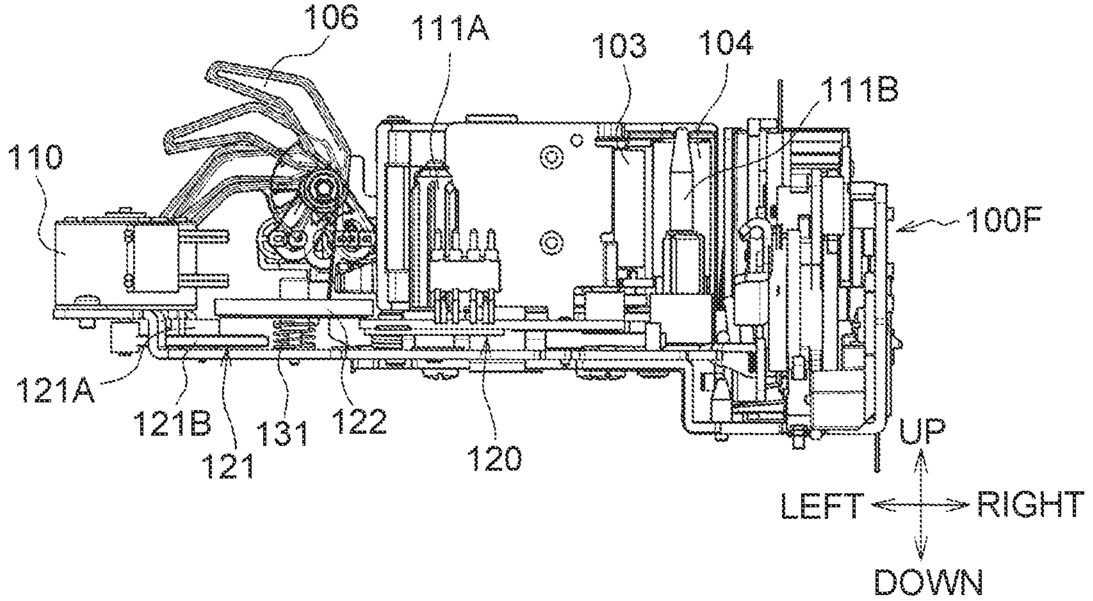
FIG. 11B is a schematic front view of the main body of FIG. 11A.

As illustrated in FIGS. 11A and 11B, the main body 100F includes a printing head 102, a platen roller 103, a pressing roller 104, a holder 105, a lever 106, a discharging roller 107, a discharging guide 108, a driving source 110, a first driving shaft 111A, a second driving shaft 111B, and a driving force transmission member 120.

Since the print head 102, the platen roller 103, the pressing roller 104, the driving source 110, the first driving shaft 111A, and the second driving shaft 111B are the same as those of the printing apparatus 1 according to the first embodiment, description thereof will be omitted.

Holder

The holder 105 is a portion that may swing in a plane orthogonal to the up-down direction. The platen roller 103 and the pressing roller 104 are supported by a holder 105.

Lever

The lever 106 is coupled to the holder 105. By swinging the lever 106 in the up-down direction, the platen roller 103 and the pressing roller 104 supported by the holder 105 is configured to move.

Discharging Roller and Discharging Guide

The discharging roller 107 is disposed such that the discharging roller 107 faces the discharging guide 108. The discharging roller 107 discharges the printing tape 31 after printing from the main body 100F along the discharging guide 108.

Driving Force Transmission Member

The driving force transmission member 120 may have either of a transmission state in which the driving force is transmitted from the driving source 110 to the platen roller 103 and a non-transmission state in which the driving force is not transmitted to the platen roller 103.

In this embodiment, the driving force transmission member 120 includes a first gear 121, a second gear 122, a third gear 123, a fourth gear 124, a fifth gear 125, a sixth gear 126, a seventh gear 127, and a displacement portion 131. The number of gears in the driving force transmission member 120 is not particularly limited. The driving force transmission member 120 may include another configuration such as a roller and a belt.

The first gear 121 is a stepped gear in which a small gear 121A and a large gear 121A having a larger radius than the small gear 121B are arranged coaxially. The large gear 121B is connected to a driving source 110.

In the transmission state as illustrated in FIGS. 10A and 10B, the small gear 121A engages with the second gear 122. On the other hand, in the non-transmission state as illustrated in FIGS. 11A and 11 B, the small gear 121A is separated from the second gear 122.

The second gear 122 is supported by the displacement portion 131 and is movable in the up-down direction. The second gear 122 is engaged with the small gear 121A in the transmission state, and is held above the small gear 121A in the non-transmission state.

The third gear 123 is engaged with the second gear 122, and is connected to the first driving shaft 111A. The fourth gear is engaged with the fifth gear 125. The sixth gear 126 is engaged with the fifth gear and a platen gear (not shown in figures) that is connected to the platen roller 103. The seventh gear 127 is engaged with the fifth gear 125 and is connected to the second driving shaft 111B.

The displacement portion 131 is a spring that supports the second gear 122 from below. The displacement portion 131 is disposed so as to be expandable and contractible in the up-down direction. When a force is not applied to the second gear 122, the displacement portion 131 holds the second gear 122 above the small gear 121A of the first gear 121. When a downward force is applied to the second gear 122, the displacement portion 131 contracts in the up-down direction, whereby the second gear 122 engages with the first gear 121.

Printing Cassette

The printing cassette 10F is attachable to and detachable from the main body 100F. The printing cassette 10F includes a first feed spool (not shown in figures), a take-up spool (not shown in figures), a second feed spool (not shown in figures), the printing tape 31, an ink ribbon (not shown in figures), and a case 40F.

The first feed spool, the take-up spool, the second feed spool, the printing tape 31, and the ink ribbon are the same as those of the printing cassette 10 of the first embodiment. The printing cassette 10F may further include a third feed spool, a laminating roller, and a laminating tape.

The case 40F stores at least part of the printing tape 31, at least part of the ink ribbon therein.

As illustrated in FIG. 10B, a part of a lower surface of the outer surface of the case 40F that faces the second gear 122 of the driving force transmission member 120 in a state where the printing cassette 10F is mounted on the main body 100F constitutes a contact portion 41 that contacts the upper end of the second gear 122. The contact portion 41 is configured to displace the driving force transmission member 120 from the non-transmission state to the transmission state in response to the contact portion contacting the second gear 122.

The contact portion 41 contacts the second gear 122 from above in a state where the printing cassette 10F is attached to the main body 100F. The contact portion 41 is configured to cause a part of the driving force transmission member 120, i.e., the second gear 122, to move in a direction parallel to the rotation axis of the platen roller 103, i.e., up-down direction.

In a state where the printing cassette 10F is attached to the main body 100F, the second gear 122 is engaged with the first gear 121 in response to the contact portion 41 contacting the second gear 122, whereby the driving force transmission member 120 is in the transmission state. Accordingly, the platen roller 103 is rotationally driven by the driving force of the driving source 110, whereby the printing tape 31 is conveyed by the platen roller 103.

Figure 12A:
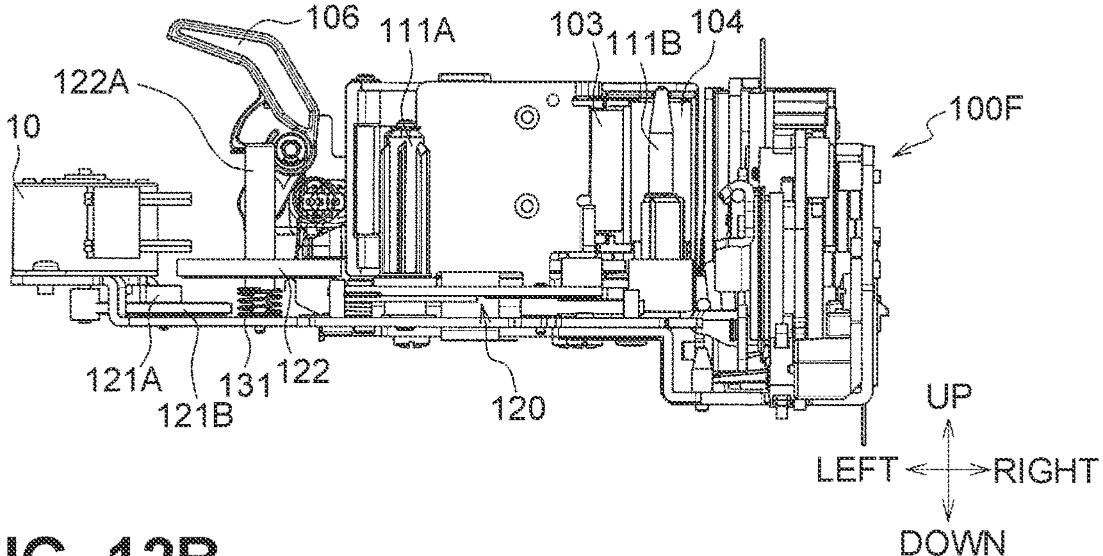
FIG. 12A is a schematic front view of a main body according to another embodiment of the disclosure different from the illustrative embodiment of FIG. 11B.
Figure 12B:
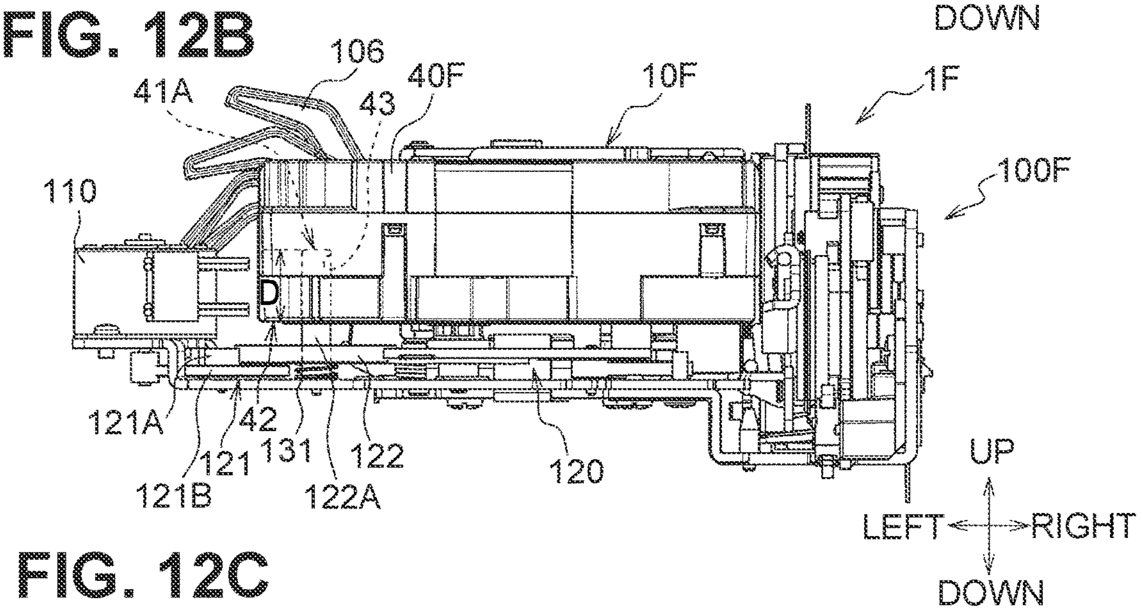
FIGS. 12B and 12C are schematic front views in a state where a printing cassette is attached to the main body of FIG. 12A.
Figure 12C:
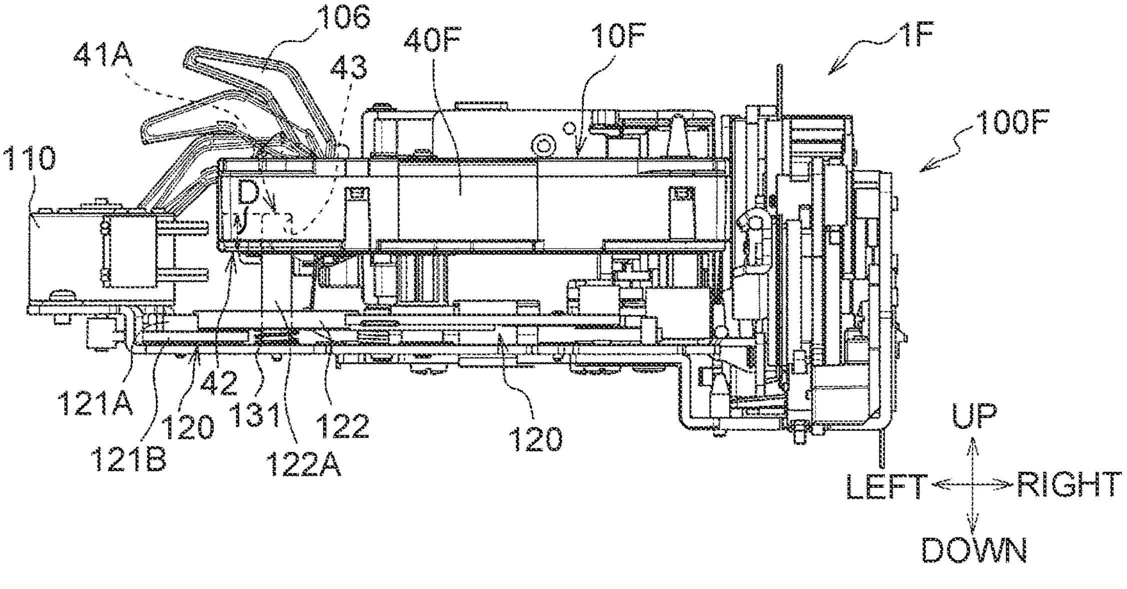

As illustrated in FIGS. 12A, 12B, and 12C, the printing cassette 10F may have a contact portion 41A located on an upstream side, i.e., above, in an attachment direction of the printing cassette 10F with respect to the bottom surface 42 that is an end surface on the downstream side, i.e., below, in the attachment direction with respect to the main body 100F.

More specifically, the contact portion 41A is located inside a recessed portion 43 that is recessed upward from the bottom surface 42 of the case 40F. The recessed portion 43 is configured such that the axial portion 122A of the second gear 122 is inserted into the recessed portion 43. The contact portion 41A is a part of the outer surface exposed to the outside of the case 40, and is located at a position where a tip of the axial portion 122A of the second gear 122 inserted into the recessed portion 43 contacts the contact portion 41A.

A distance D in the up-down direction between the bottom surface 42 and the contact portion 41A is set in accordance with a width, i.e., height, of the case 40F. For example, the printing cassette 10F as illustrated in FIG. 12C is thinner than the printing cassette 10F as illustrated in FIG. 12B, but the distance D between the bottom surface 42 and the contact portion 41A is less than a height of the printing cassette 12B in FIG. 12B in the up-down direction.

The contact position of the contact portion 12B and the second gear 122 is the same between FIGS. 12B and 12C. Thus, printing cassettes 10F having different thicknesses may be selectively mounted on the same main body 100F.

7-2. Effect

According to this embodiment, following effects are obtained.

(7a) Since the driving force transmission member 120 is displaced from the non-transmission state to the transmission state in response to the contact portion 41 contacting the second gear 122, the driving force is transmitted to the platen roller 103 only in a state where the printing cassette 10F is mounted on the main body 100F. Thus, unexpected rotation of the platen roller 103 in a state where the printing cassette 10 is not attached may be suppressed.

8. Eighth Embodiment 8-1. Configuration

Figure 13A:
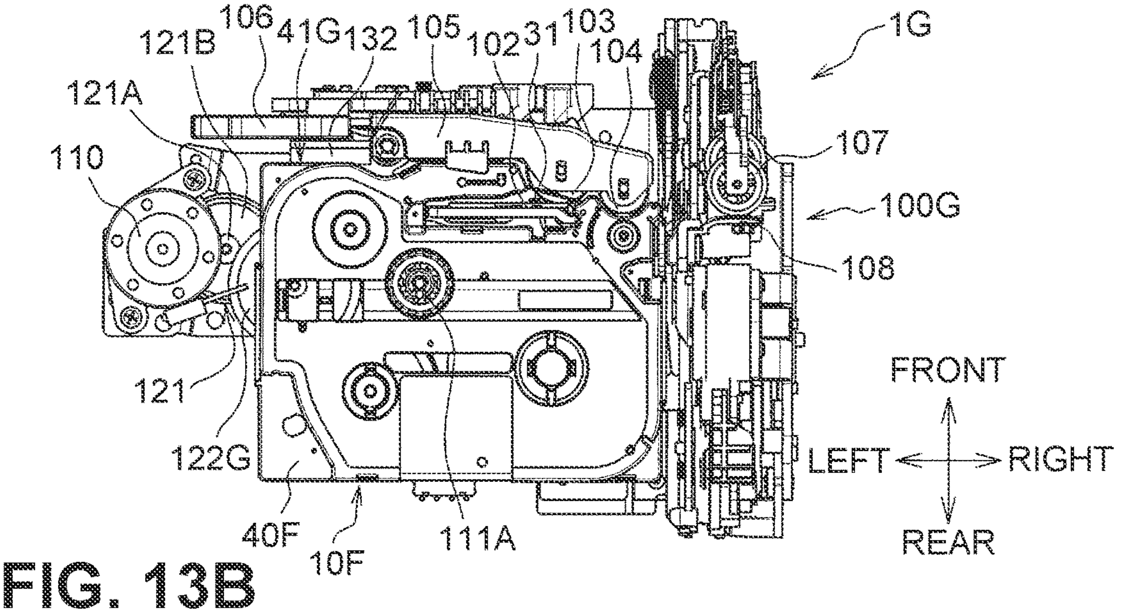
FIG. 13A is a schematic plane view of the printer according to another embodiment of the disclosure different from the illustrative embodiment of FIGS. 1 and 10A.
Figure 13B:
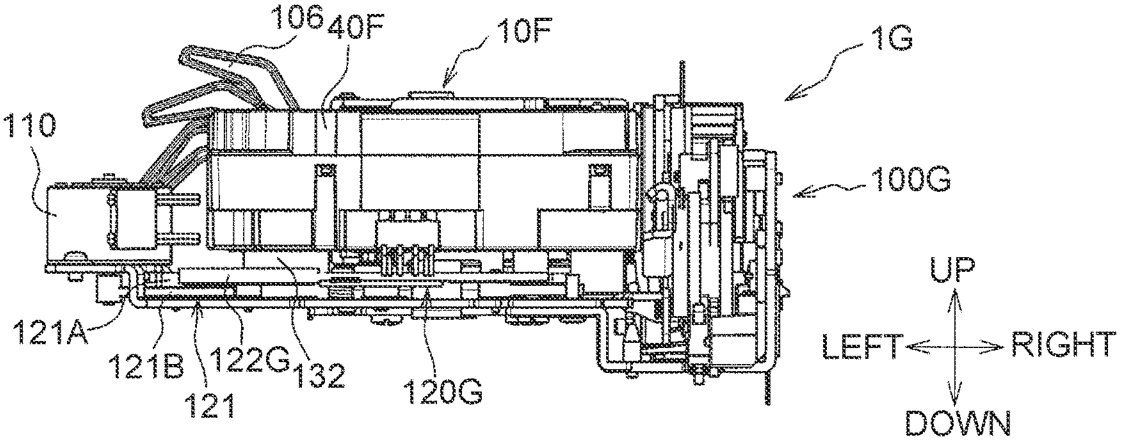
FIG. 13B is a schematic front view of the printer of FIG. 13A.
Figure 13C:
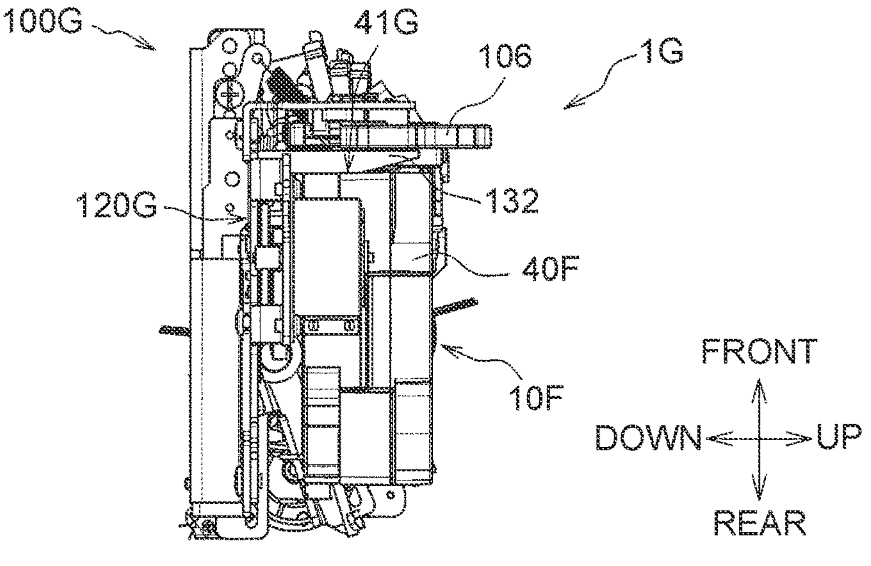
FIG. 13C is a schematic side view of the printer of FIG. 13A.

As illustrated in FIGS. 13A, 13B and 13C, a printer 1G includes a printing cassette 10F and a main body 100G.

Main Body

Figure 14A:
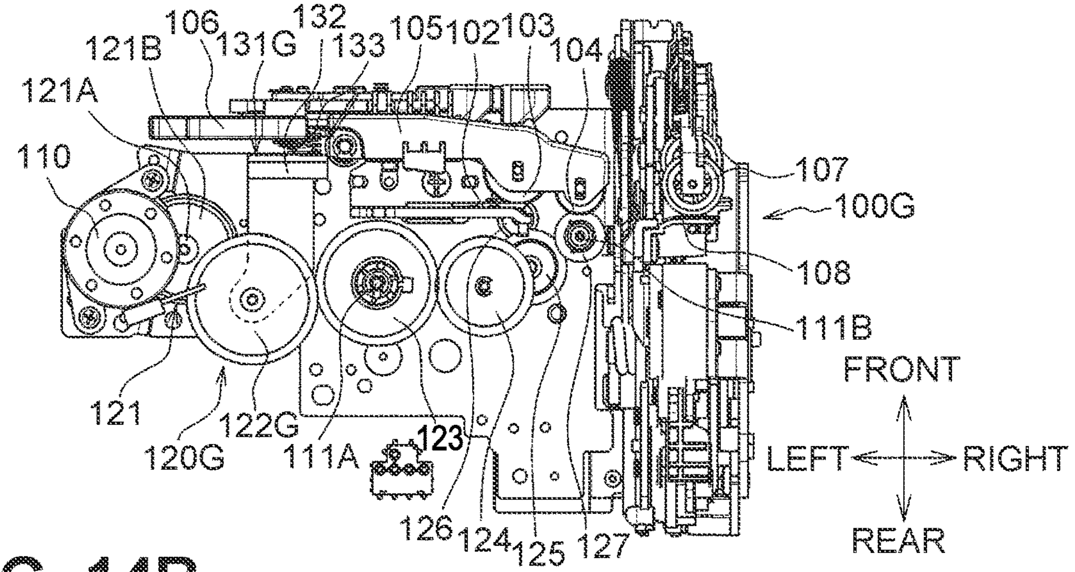
FIG. 14A is a schematic plan view of the main body in the printer of 13A.
Figure 14B:
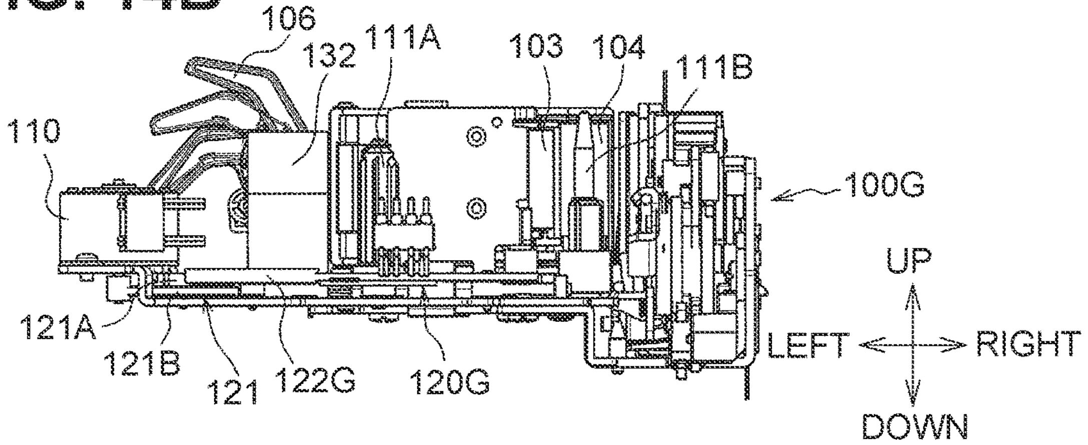
FIG. 14B is a schematic front view of the main body of FIG. 14A.
Figure 14C:
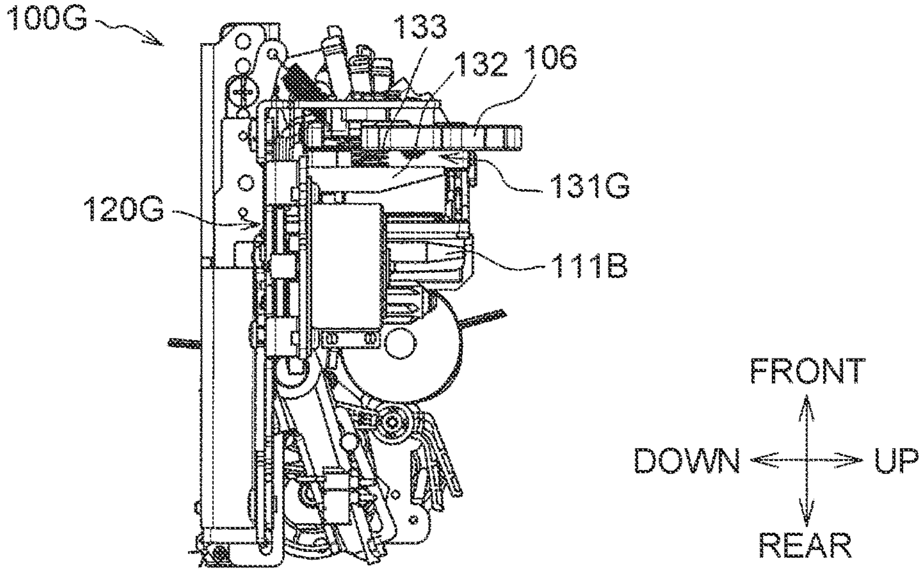
FIG. 14C is a schematic side view of the printer of FIG. 13A.

As illustrated in FIGS. 14A, 14B and 14C, the main body 100G includes a driving force transmission member 120G in place of the driving force transmission member 120 in the main body 100F of the seventh embodiment. Other configurations of the main body 100G are the same as those of the main body 100F of the seventh embodiment except for points described below, and thus description thereof will be omitted.

Driving Force Transmission Member

The driving force transmission member 120G may have either of a transmission state in which the driving force is transmitted from the driving source 110 to the platen roller 103 and a non-transmission state in which the driving force is not transmitted to the platen roller 103.

In this embodiment, the driving force transmission member 120G includes a first gear 121, a second gear 122, a third gear 123, a fourth gear 124, a fifth gear 125, a sixth gear 126, a seventh gear 127, and a displacement portion 131G. The first gear 121, the third gear 123, the fourth gear 124, the fifth gear 125, the sixth gear 126, and the seventh gear 127 are the same as those of the driving force transmission member 120 of the seventh embodiment.

The second gear 122G is connected to the displacement portion 131G, and is movable in the front-rear direction. The second gear 122G is engaged with the small gear 121A of the first gear 121 in the transmission state, and is held at a position shifted backward with respect to the small gear 121A in the non-transmission state.

The displacement portion 131G includes a moving portion 132 and a spring 133.

The moving portion 132 is connected to an axial portion of the second gear 122G, and is slidable in the front-rear direction. The moving portion 132 has a wall surface intersecting the front-rear direction.

The spring 133 is a spring that supports the moving portion 132 from the front. The spring 133 is located so as to be expandable and contractible in the front-rear direction. In a case where force is not acting on the moving portion 132, the spring 133 holds the moving portion 132 at a position where the second gear 122 is separated from a small gear 121A of the first gear 121. In response to a forward force being applied to the moving portion 132, the spring 133 contracts in the front-rear direction, whereby the moving portion 132 moves forward and the second gear 122 engages with the first gear 121.

Printing Cassette

The printing cassette 10F of eighth embodiment is the same as the printing cassette 10F of the seventh embodiment except for points described below.

In this embodiment, as illustrated in FIGS. 13A and 13C, a part of the front surface facing the moving portion 132 of the driving force transmission member 120G, which is a part of the outer surface of the case 40F, in a state where the printing cassette 10F is mounted on the main body 100G is a contact portion 41G that contacts the wall surface of the moving portion 132. The contact portion 41G is configured to displace the driving force transmission member 120 from the non-transmission state to the transmission state in response to the contact portion 41G contacting the moving portion 132.

The contact portion 41G contacts the moving portion 132 from the rear in a state where the printing cassette 10F is attached to the main body 100G. The contact portion 41G is configured to cause a part of the driving force transmission member 120G, i.e., the displacement portion 131G, to move in a plane intersecting the rotational axis of the platen roller 103, i.e., in the front-rear direction.

In a state where the printing cassette 10F is attached to the main body 100G, the second gear 122 engages with the first gear 121 in response to the contact portion 41G contacting the displacement portion 131G, whereby the driving force transmission member 120 is in the transmission state. Accordingly, the platen roller 103 is rotationally driven by the driving force of the driving source 110, whereby the printing tape 31 is conveyed by the platen roller 103.

8-2. Effect

According to this embodiment, following effects are obtained.

(8a) Since a part of the driving force transmission member 120G is configured to move in a direction intersecting the rotational axis of the platen roller 103, a degree of design freedom of the main body 100G may be increased.

9. Another Embodiment

Although the embodiments of the present disclosure have been described above, it is needless to say that the present disclosure is not limited to the above-described embodiments and may take various forms.

(9a) In the printing cassette of the above-described embodiment, the input portion to which the driving force of the driving source is transmitted is not limited to a gear or a spool. For example, a roller may be used as the input portion. Further, the output portion that transmits the driving force transmitted to the input portion to the platen roller is not limited to a gear. For example, a roller or a spool may be used as the output portion.

(9b) In the printing cassettes of the seventh embodiment and the eighth embodiment, the contact portion may not necessarily be constituted by a part of the outer surface of the case. The printing cassette may have a contact portion independent of the case.

(9c) The functions of one component in the above embodiment may be distributed as a plurality of components, or the functions of a plurality of components may be integrated into one component. Further, a part of the configuration of the above embodiment may be omitted. In addition, at least a part of the configuration of the above-described embodiment may be added to or replaced with another configuration of the above-described embodiment. All aspects included in the technical idea specified by the wording described in the claims are embodiments of the present disclosure.

What is claimed is:

1. A printer comprising:
a printing cassette; and
a printer main body,
wherein the printer main body comprises:
a print head;
a platen roller facing the print head and configured to rotate around a rotation axis thereof; and
a drive source,
wherein the printing cassette comprises:
a printing tape;
an input unit configured to rotate around a rotation axis thereof;
a cassette side transmission mechanism connected to the input unit; and
an output unit connected to the cassette side transmission mechanism and configured to rotate around a rotation axis thereof,
wherein in a state where the printing cassette is attached to the printer main body,
the drive source is connected to the input unit,
the platen roller is connected to the output unit, and
the platen roller is configured to convey the printing tape by a rotational driving force transmitted from the drive source through each of the input unit, the cassette side transmission mechanism, and the output unit, and
wherein in a state where the printing cassette is detached from the printer main body,
the drive source is unconnected to the platen roller.

2. The printer according to claim 1,
wherein the printing cassette further comprises:
an ink ribbon; and
a take-up spool configured to take up the ink ribbon,
wherein the take-up spool has an inner surface including spline teeth, and
wherein the rotation axis of the input unit is configured to pass through a hollow portion that is defined by the inner surface of the take-up spool.

3. The printer according to claim 2,
wherein the take-up spool is rotatable around a rotation axis thereof, and
wherein the rotation axis of the input unit and the rotation axis of the take-up spool extend in the same straight line.

4. The printer according to claim 1,
wherein the printing cassette further comprises a second tape that is laminated to the printing tape, and
wherein the input unit is a laminating roller that is configured to laminate the printing tape and the second tape.

5. The printer according to claim 1,
wherein the printing cassette further comprises:
an ink ribbon; and
a take-up spool that is configured to take up the ink ribbon,
wherein the take-up spool is rotatable around a rotation axis thereof, and
wherein the rotation axis of the input unit and the rotation axis of the take-up spool extend in the same straight line.

6. The printer according to claim 1,
wherein the rotation axis of the input unit and the rotation axis of the output unit extend in the same straight line.

7. The printer according to claim 6,
wherein the printing cassette further comprises a rotary body in which the input unit and the output unit are integrated.

8. The printer according to claim 7,
wherein the rotary body is a single gear.

9. The printer according to claim 8,
wherein the single gear is rotatable around a rotation axis thereof,
wherein the rotation axis of the single gear is parallel to an attachment direction of the printing cassette into the printer main body, and
a total tooth depth of the single gear is less along the attachment direction.

10. The printer according to claim 1,
wherein the rotation axis of the input unit and the rotation axis of the output unit extend in different straight lines.

11. A printer comprising:
a printing cassette; and
a printer main body,
wherein the printer main body comprises:
a print head;
a platen roller facing the print head and configured to rotate around a rotation axis thereof; and
a drive source,
wherein the printing cassette comprises:
a printing tape;
an input unit configured to rotate around a rotation axis thereof;
a cassette side transmission mechanism connected to the input unit; and
an output unit connected to the cassette side transmission mechanism and configured to rotate around a rotation axis thereof,
wherein in a state where the printing cassette is attached to the printer main body,
the drive source is connected to the input unit,
the platen roller is connected to the output unit, and
the platen roller is configured to convey the printing tape by a rotational driving force transmitted from the drive source through each of the input unit, the cassette side transmission mechanism, and the output unit,
wherein in a state where the printing cassette is detached from the printer main body,
the drive source is unconnected to the platen roller,
wherein the printing cassette further comprises a case that includes at least a part of the first tape, at least a part of the input unit, and at least a part of the output unit therein, and
wherein the at least a part of the input unit protrudes from the case toward a direction orthogonal to the rotation axis of the input unit.

12. A printer comprising:
a printing cassette; and
a printer main body,
wherein the printer main body comprises:
a print head;
a platen roller facing the print head and configured to rotate around a rotation axis thereof; and
a drive source,
wherein the printing cassette comprises:
a printing tape;
an input unit configured to rotate around a rotation axis thereof;
a cassette side transmission mechanism connected to the input unit; and
an output unit connected to the cassette side transmission mechanism and configured to rotate around a rotation axis thereof,
wherein in a state where the printing cassette is attached to the printer main body,
the drive source is connected to the input unit,
the platen roller is connected to the output unit, and
the platen roller is configured to convey the printing tape by a rotational driving force transmitted from the drive source through each of the input unit, the cassette side transmission mechanism, and the output unit,
wherein in a state where the printing cassette is detached from the printer main body,
the drive source is unconnected to the platen roller,
wherein the printing cassette further comprises a case that includes at least a part of the printing tape, at least a part of the input unit, and at least a part of the output unit therein, and
wherein the at least a part of the output unit protrudes from the case toward a direction orthogonal to the rotation axis of the output unit.

* * * * *